(No Model.)

O. P. HURFORD.
REEL BOLT.

No. 367,757. Patented Aug. 2, 1887.

Attest:
Andrew W. Steiger,
George B. Wilton

Inventor:
O. P. Hurford,
By Jacob Felbel
Att'y.

(No Model.) 2 Sheets—Sheet 2.

O. P. HURFORD.
REEL BOLT.

No. 367,757. Patented Aug. 2, 1887.

Attest:
Andrew W. Steger,
George B. Wilton

Inventor:
O. P. Hurford,
By Jacob Felbel
Att'y

UNITED STATES PATENT OFFICE.

OLIVER PERRY HURFORD, OF OAKDALE, NEBRASKA.

REEL-BOLT.

SPECIFICATION forming part of Letters Patent No. 367,757, dated August 2, 1887.

Application filed May 11, 1886. Serial No. 201,805. (No model.)

*To all whom it may concern:*

Be it known that I, OLIVER PERRY HURFORD, a citizen of the United States, and a resident of Oakdale, in the county of Antelope and State of Nebraska, have invented certain new and useful Improvements in Reel-Bolts, &c., of which the following is a specification.

My present invention relates to rotary flour-bolts and middlings-purifiers of the kind or type employing brushes to clear the meshes of the bolting-cloths of particles of flour or other matter which may have adhered thereto during the rotation of the reel and the sifting of the material being operated upon. Machines of this description form the subject-matter of Letters Patent granted to me on the 25th day of March, 1884, No. 295,555, and on the 24th day of November, 1885, No. 331,240.

In the use of machines of the class described it has been found that some of the particles of flour or other matter swept from the inner faces of the bolting-cloths lodge upon the brushes and ultimately so clog them up that the work of keeping clean the meshes of the cloths is not as effectually accomplished as it is desired.

The main object of my present invention is to provide against clogging of the brushes, and hence to produce a machine that will give better results and greater satisfaction in its working.

My invention consists in the features of construction and combinations of devices hereinafter more fully described, and particularly pointed out in the claims.

Figure 1:
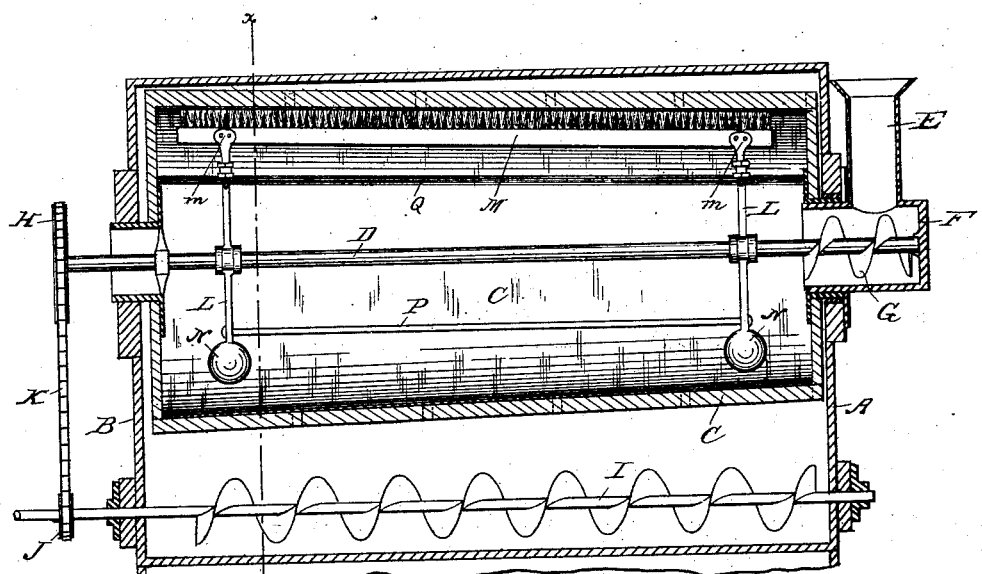
Figure 2:
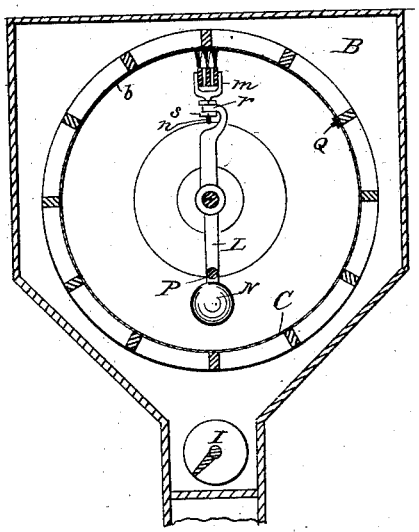
Figure 3:
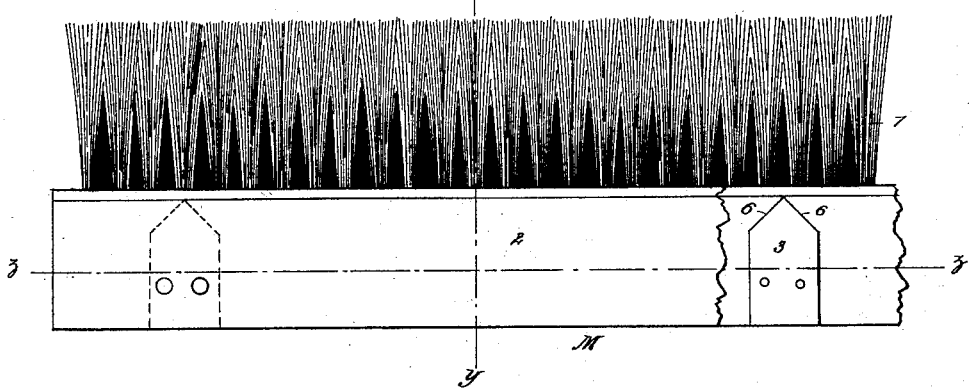
Figure 5:
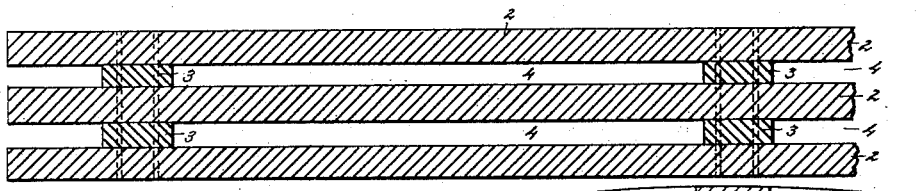
Figure 4:
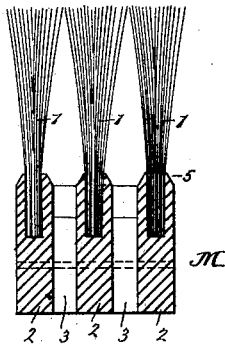
Figure 6:
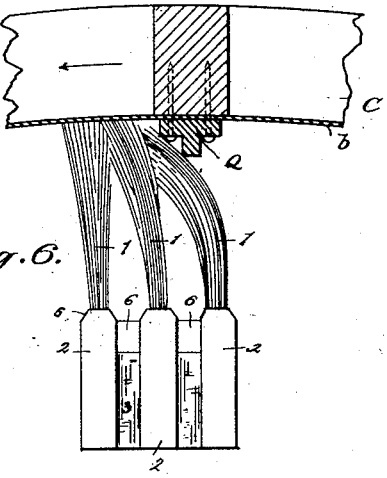

In the accompanying drawings, Figure 1 is a longitudinal vertical section of a bolting-reel embodying my improvements. Fig. 2 is a transverse vertical section of the same taken at the line *x x*, Fig. 1. Fig. 3 is a side elevation of the brush on an enlarged scale, and broken away at one end to more fully show its detail construction. Fig. 4 is a vertical cross-section of the brush, same scale, taken at the line *y y* of Fig. 3. Fig. 5 is a horizontal section of the brush, same scale, and taken at a plane represented by the dotted line *z z* at Fig. 3. Fig. 6 is a cross-section, same scale, showing a portion of the reel and the bolting-cloth, the brush, and the device for clearing the brush.

In the several views the same parts will be found designated by the same numerals and letters of reference.

The general construction of reel and the mode of suspending the brush shown in the several figures, it will be observed, are substantially like that shown and described in my Letters Patent of March 25, 1884, and hence no detailed description of these features is necessary in this specification.

A represents the head of the machine, and B the foot thereof.

C represents the bolting reel, which is shown tapering in form.

D is a central shaft to which the reel is secured, so that it may revolve therewith.

At the head of the machine is a supply-hopper, E, and a feed box or tube, F, which is provided with a screw-conveyor, G, to carry the flour or other material into the reel in the usual manner, and at the foot of the machine the shaft D is furnished with a sprocket-wheel, H.

At the bottom of the machine is located the usual screw-conveyer, I, for the purpose of discharging the sifted and graded material in the well-known manner or in the manner shown in my aforesaid Letters Patent. That end of the shaft of the screw-conveyer I which is at the foot of the machine is provided with a sprocket-wheel, J, and a chain-belt, K, is employed to band together the sprocket-wheels J and K.

Upon the reel-shaft D are hung arms L L, to the upper ends of which a brush, M, is secured by means of bifurcated supports *m m*, (fastened to the sides of the brush,) having threaded shanks *n n*, which pass through eyes *r r* in the arms L L, and are held thereto by nuts *s s*. The lower ends of the arms L L are weighted, as at N N, to keep the brush always at the upper part of the reel, and a rod or bar, P, connects the lower portions of the arms together to maintain them in the same vertical plane, all as seen in my patent of March 25, 1884.

Longitudinally of the reel C is attached a rod, strip, or other device, Q, preferably of wood, and equal in length to the length of the brush M, which, during the rotations of the reel, rubs or whisks over the ends of the bristles of the brush and frees them from the flour received while sweeping the surfaces of the bolting-cloths b. Although I have shown only one of these strips Q, and in practice have found the same to be ample, it will be understood that two or more strips may be employed, and that they may be secured at various points around the periphery of the reel.

The brush M illustrated in the drawings is of a novel construction, and is particularly adapted for sweeping the bolting-cloths of reels.

Each row of bristles 1, or other brushing devices, is preferably secured to a separate base or backing, 2, of wood. Blocks of wood 3 are interposed between the several bases or backings, and the whole fastened together by means of nails, screws, or other devices, as shown. By thus forming the brush it will be seen that openings, as 4, are provided between the several backs of the several rows of bristles, and that through these openings the flour, finding its way down between the rows of the bristles, will pass out of the brush and back to the bottom of the reel.

Of course, in lieu of making the brush backs of separate pieces and then joining them together with interposed blocks, as shown, they may be made of a single piece cut out to form the openings for the escape of the flour settling between the rows of bristles; but this mode of manufacture is more costly and hence not so desirable as that practiced by me.

In order to have as little flour as possible settle upon the bases of the brushes, I bevel or chamfer the upper edges of each section 2 as shown at 5, and likewise so form the upper edges of the interposed blocks 3 as illustrated at 6.

From the foregoing description of the construction of the parts involving my improvements and the following explanation of the mode of operation of a machine in which my improvements are embodied one skilled in the art of milling will be enabled to make and use machines containing my invention.

If the power to drive the machine be applied to the shaft of the screw-conveyer I, motion will be imparted to the reel C through the intervention of the belt K, chain wheel or pulley H, and shaft D, and also to the screw-conveyer G, which for convenience is shown as forming part of the shaft D. Flour supplied to the hopper E during the operation of the machine will fall into the box F and be fed to the interior of the reel by means of the conveyer G. The sifting and grading of the flour through the meshes of the reel's clothing takes place within the reel in the usual manner, and no further description concerning this operation is deemed to be necessary.

As will be understood, during the rotations of the reel the brush is held at the upper part of the reel and sweeps or clears the bolting-cloths of the flour, &c., clinging thereto. A greater portion of the sweepings will fall at once to the bottom of the reel outside of the brush, but still a considerable portion will settle upon the brush. The particles so lodging upon the brush are periodically swept off by the longitudinally-arranged strip Q, which at each revolution of the reel comes in contact with the outer ends of the bristles, as indicated at Fig. 6 of the drawings.

It will be understood that any particles which may descend between the rows of bristles either directly from the bolting-cloths or from the tops of the bristles during the action of the strip Q will fall through the spaces 4 to the bottom of the reel. Thus by means of the strip Q and by the peculiar construction of the brush the liability of the latter to become clogged or choked up is wholly avoided.

While I have shown a machine in which the strip Q and my improved construction of brush are both embodied, I wish it understood that I do not desire my invention to be considered as limited to a machine in which both are employed, although such a machine will, in my estimation, give the very best results.

The clearing-strip Q may be used with the old style of brush, and yet the machine will be more perfect in its action. So, also, may my improved brush be used in a machine devoid of any clearing strip, and the operation of sweeping the meshes of the bolting-cloth will be more perfectly performed by reason of the capacity of the brush to free itself of much of the matter which would otherwise clog or choke it.

What I claim as new, and desire to secure by Letters Patent, is—

1. The combination of a reel provided with bolting-cloth, an interiorly-arranged brush for sweeping the inner surface of said cloth, and a device secured on the inside of the reel-frame and adapted during the revolutions of the reel to periodically disturb or agitate the outer end of the brush and free it of matter which may have lodged thereon, as set forth.

2. The combination of a reel provided with bolting-cloth, an interiorly-arranged brush having an opening in its base between the rows of bristles, and means for holding said brush at the upper part of the reel, whereby the said brush may sweep the inner surface of said bolting-cloth at the upper part of the reel and a portion of the sweepings descend through said opening to the bottom of the reel, thus avoiding a clogging of the brush, as set forth.

3. The combination of a reel provided with bolting-cloth, an interiorly-arranged brush having an opening in its base between the rows of bristles, means for holding said brush at the upper part of the reel, and a clearing-strip secured to the interior of the reel-frame and revolving therewith, as and for the purposes set forth.

Signed at Wilmington, in the county of New Castle and State of Delaware, this 30th day of April, A. D. 1886.

OLIVER PERRY HURFORD.

Witnesses:
T. P. MERRITT,
HUGH E. McCAFFREY.